United States Patent [19]

Spilde

[11] Patent Number: 4,832,260
[45] Date of Patent: *May 23, 1989

[54] EMERGENCY VENTILATION SYSTEM

[76] Inventor: Rodney L. Spilde, 6300 W. Richmond Rd., Aberdeen, S. Dak. 57401

[*] Notice: The portion of the term of this patent subsequent to May 23, 1999, has been disclaimed.

[21] Appl. No.: 77,955

[22] Filed: Jul. 23, 1987

Related U.S. Application Data

[63] Continuation of Ser. No. 703,052, Jul. 6, 1976, abandoned.

[51] Int. Cl.$^4$ .............................................. F24F 13/08
[52] U.S. Cl. ................................... 236/49.4; 49/141; 236/81
[58] Field of Search ......................... 236/49, 81, 90; 340/654; 307/125, 126; 49/31,141

[56] References Cited

U.S. PATENT DOCUMENTS

| | | | |
|---|---|---|---|
| 379,201 | 3/1888 | Johnson | 236/49 X |
| 422,665 | 3/1890 | Tryon | 236/49 |
| 625,518 | 5/1899 | Roesch | 236/81 |
| 818,229 | 4/1906 | Chadborn | 98/33 |
| 1,615,964 | 2/1927 | Straight | 98/33 |
| 1,995,213 | 3/1935 | Martin | 119/31 |
| 2,057,627 | 10/1936 | Ferris | 98/33 |
| 2,061,712 | 11/1936 | Martin | 119/31 |
| 2,316,309 | 4/1943 | Blain | 236/49 |
| 2,335,173 | 11/1943 | Corey | 119/21 |
| 2,354,292 | 7/1944 | Waterman | 98/33 |
| 2,479,243 | 8/1949 | Larsen | 236/49 |
| 2,740,626 | 4/1956 | Hall | 236/49 X |
| 3,329,341 | 7/1967 | Jones | 236/49 X |
| 3,396,702 | 8/1968 | Trussell | 119/17 |
| 3,481,076 | 12/1969 | Bedard | 49/31 X |
| 3,601,096 | 8/1981 | Rutherford | 119/15 |
| 3,915,377 | 10/1975 | Sutton, Jr. | 236/49 |
| 3,921,563 | 11/1975 | Edwards et al. | 116/65 |
| 4,213,379 | 7/1980 | Cromley | 98/33 R |

Primary Examiner—William E. Tapolcai
Attorney, Agent, or Firm—Merchant, Gould, Smith, Edell, Welter & Schmidt

[57] ABSTRACT

An apparatus and method for controlling emergency ventilation of a liverstock building comprising an environment sensor (12), air operated trip mechanism (14), and a source(10) of compressed air. The trip mechanism (14) is connected to open or close doors, windows or other sources of ventilation in the building in response to the presence or absence of the compressed air. Upon sensing a deviation from a prescribed ventilation norm, the environmental sensor (12) controls application of the compressed air to the trip mechanism (14) via solenoid valves (24, 30) to reverse the state of the building ventilation, i.e., to close the ventilation source if open, or to open the ventilation source if closed.

18 Claims, 5 Drawing Sheets

EMERGENCY VENTILATION SYSTEM

This is a continuation of application Ser. No. 703,052, filed July 6, 1976, now abandoned.

BACKGROUND AND FIELD OF THE INVENTION

Briefly, the invention relates to building ventilation, in general; to ventilation of livestock buildings, in particular; and, specifically, to emergency ventilation of livestock buildings.

Maintenance of a fresh supply of air at a proper temperature in a livestock building is extremely important. An important predicate of modern controlled-environment animal husbandry is maximization of animal density in order to minimize production costs. In such instances of maximum animal density, failure of the building's normal ventilation system could result in a rapid change in either or both the environment temperature or gas content to a level outside the safe limits of the animals in the building and ultimately result in the death of a large number of animals. Even small scale animal raisers such as the average American farmer frequently experience emergency conditions in their livestock buildings which if uncorrected are fatal to their stock. These latter fatalities, though orders of magnitude lesser in absolute numbers, can in fact be more disastrous to the small stockman or grower than a loss of many times more animals to a large scale grower or stockman.

A general object of the invention is an emergency ventilation system for a livestock building.

Another object of the invention is a ventilation system which is responsive to a deviation from a prescribed norm in a building environment to activate an emergency ventilation system.

A further object of the invention is a ventilation system which is responsive to the temperature of a livestock building exceeding a prescribed limit to open doors, windows, or other building openings.

An additional object of the invention is a ventilation system which is responsive to a building electrical power outage to provide emergency ventilation.

Still another object of the invention is a ventilation system which is unresponsive to short term or intermittent electrical power outages yet responsive to a long term outage to provide emergency ventilation.

Yet a further object of the invention is an emergency ventilation system operative from stored energy.

Even another object of the invention is an emergency ventilation system operative by compressed air.

An additional object of the invention is to provide an emergency ventilation system based on scientific principles which are readily and easily understood, and which is easily and readily installed, operated and maintained.

BRIEF DESCRIPTION OF INVENTION

Briefly, the invention comprises a source of compressed air, one or more air operated trip mechanisms coupled to the compressed air and for operating doors or windows or other ventilation means from a closed to open position, or vice versa, and environment sensing means which controls operation of the trip mechanism by the compressed air.

According to a preferred embodiment of the invention, the source of compressed air is a conventional air compressor, and the environment sensing means senses both temperature and electrical power. The compressor includes a motor, compressor unit, and a pressure tank for maintaining a reserve supply of air. The temperature sensing means includes a thermostat and an electro-pneumatic solenoid (the "temperature" solenoid). Upon the thermostat sensing a predetermined temperature representative of the temperature deviating from a prescribed norm, the thermostat provides an output signal to actuate the temperature solenoid which is connected in series in the air line between the compressed air and said air operated trip mechanism. Actuation of the temperature solenoid operates the trip mechanism to open or close as the case may be, a building opening such as a door or window. A power sensing electro-pneumatic solenoid (the "power" solenoid) coupled to a bleeder valve provides power outage sensing. This power solenoid, as was the temperature solenoid, is likewise coupled in series between the compressed air and trip mechanism. Upon each loss of power, the power solenoid is activated to couple the line leading to the trip mechanism to the bleeder valve. The bleeder valve gradually releases air and reduces the line air pressure at a controlled rate. If the power is off long enough, the air in the line and the reserve air is bled off until the line pressure drops below the trip point of the trip mechanism and the mechanism is activated. The air operated trip mechanism of the preferred embodiment comprises a spring loaded thrust shaft. Normally, a spring of a similarly spring loaded piston is held in a compressed state by the line air pressure acting on the piston. In the compressed state, the piston shaft holds a trigger into an indent in the thrust shaft to likewise hold the thrust shaft in a compressed state. Upon a sufficient drop in line pressure, the piston spring expands to drive the piston in a direction to lift the trigger out of the thrust shaft indent and release the thrust shaft. The thrust shaft is positioned to open a door or window when released.

DETAILED DESCRIPTION OF INVENTION

Figure 1:
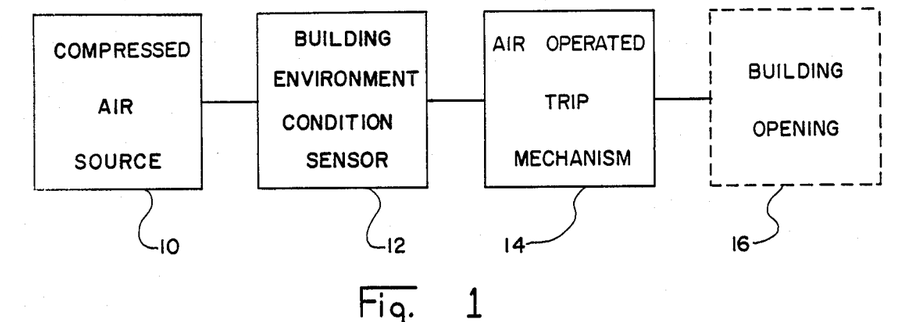
FIG. 1 is a block diagram of an Emergency Ventilation System according to the present invention.

A block diagram of the invention is illustrated in FIG. 1 wherein a source of compressed air is shown as 10, a building environment condition sensor as 12, an air operated trip mechanism as 14, and the building opening, such as a window, door, or other opening, is shown in dashed lines as 16. Compressed air per se is old and well known and is so old and well known that the scientific principles of a compressed air system are readily and easily understood. Similarly, it is relatively easy for a person to install, operate and maintain a compressed air system.

Figure 2:
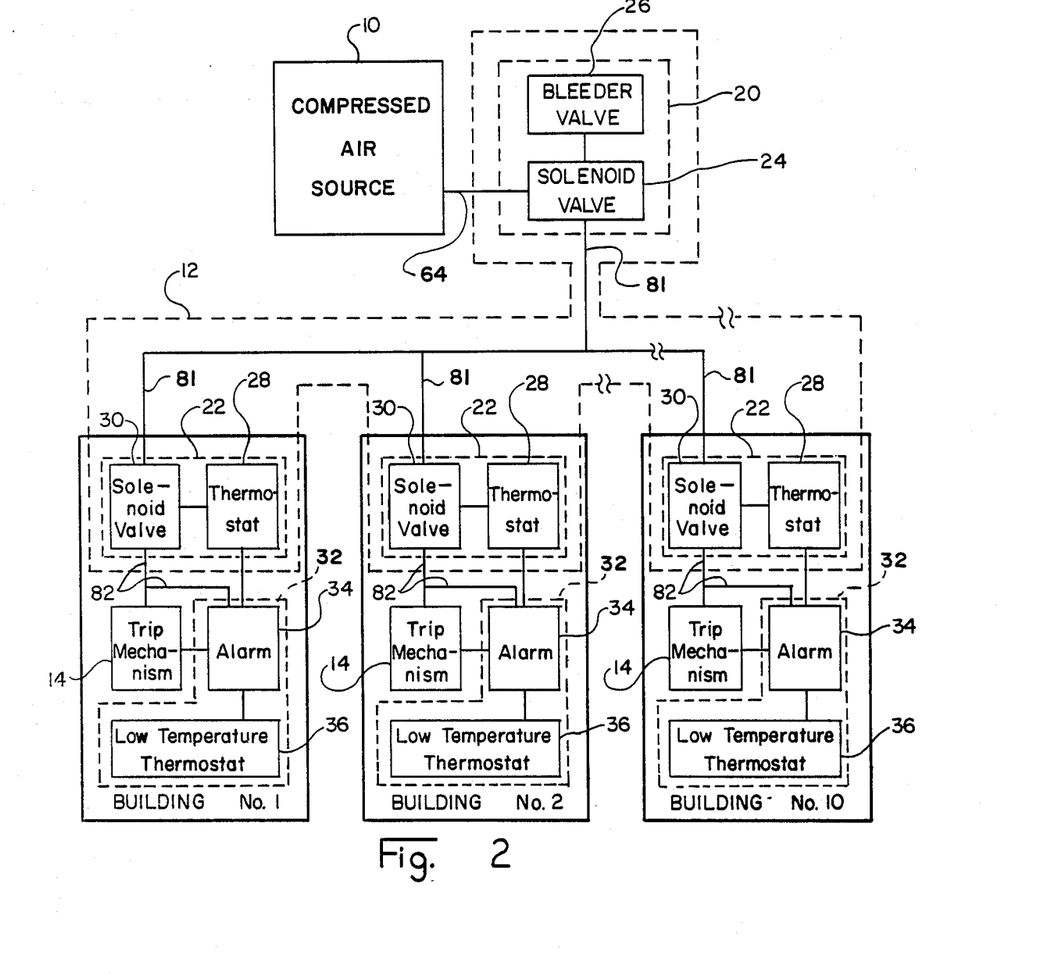
FIG. 2 is a schematic diagram of a preferred embodiment of the present invention.

FIG. 2 is a schematic diagram of a preferred embodiment of the invention. As shown, sensor 12 comprises a single power sensor 20, and a plurality of temperature sensors 22, one temperature sensor for each building. Power sensor 20 includes a voltage or current sensing electro-pneumatic power solenoid valve 24 and a bleeder valve 26. Each temperature sensor 22 includes a thermostat 28 and an electropneumatic temperature solenoid valve 30. For the illustrative embodiment of FIG. 2, the system is schematically illustrated as comprising ten buildings, although only three buildings have been shown in order to eliminate unnecessary redundancy. In the preferred embodiment showm, in addition to a temperature sensor, each building includes at least one air operated trip mechanism 14 and also includes a corrective action indicator section 32, which in the present embodiment comprises an alarm 34, and a low temperature thermostat 36.

Figure 3:
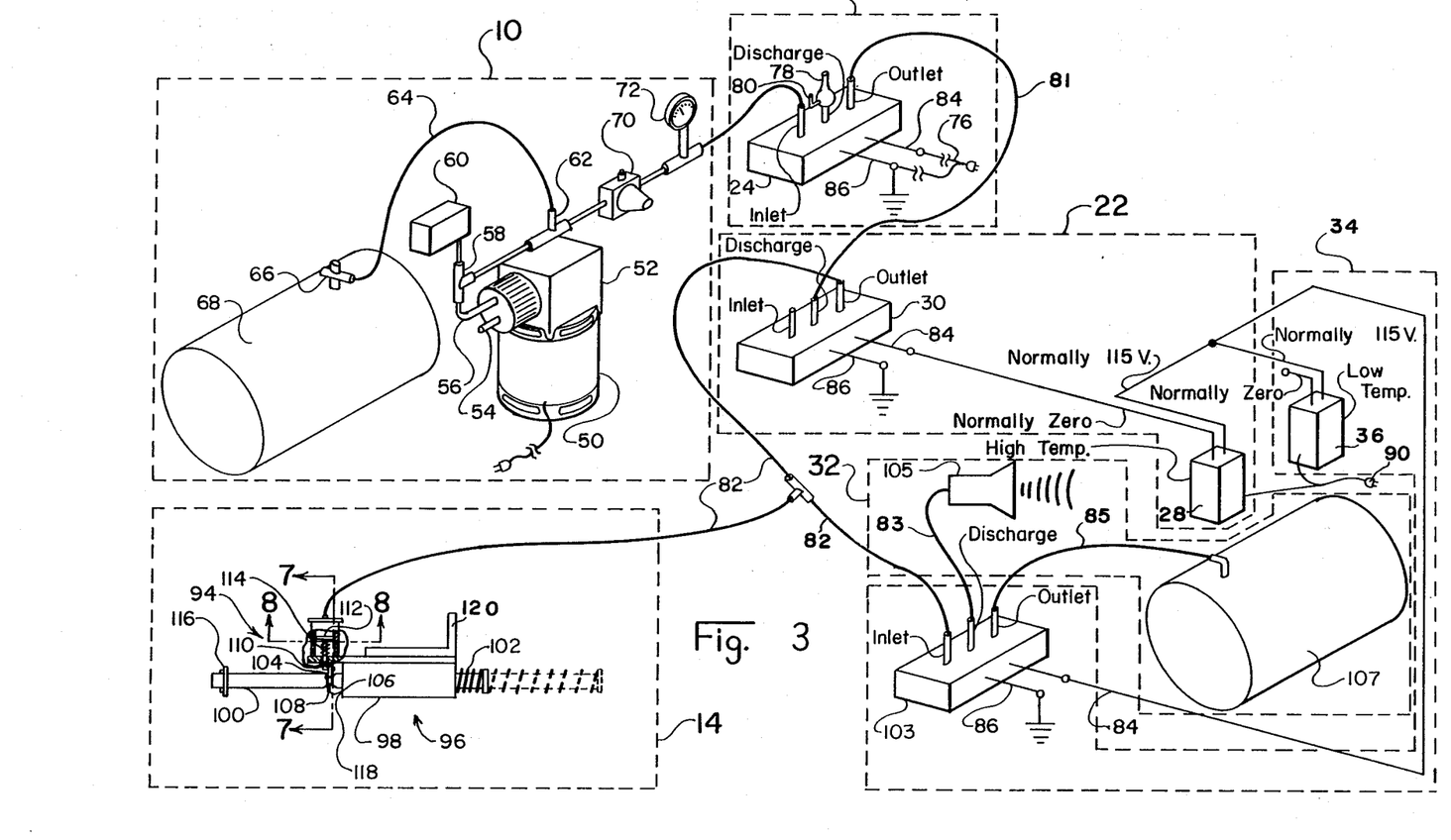
FIG. 3 is a detailed drawing partially in perspective and partially in plan view of the principal components of the preferred embodiment of the present invention of FIG. 2.

FIG. 3 is a detailed drawing of the principal components of the preferred embodiment of the invention of FIG. 2. The source of compressed air 10 comprises a motor 50 which drives a compressor unit 52. Compressor unit 52 includes an air-intake port 54 and an air-outlet port 56, the latter of which is coupled to T-fitting 58. A pressure switch 60 is connected to T-fitting 58 as is another T-fitting 62. Hose 64 connects fitting 62 through a safety valve 66 to a pressure tank 68. The other connection of fitting 62 is the ultimate source of the system line compressed air, either directly from compressor unit 52 via outlet port 56 when the compressor is on, or from the reserve air supply in pressure tank 68 when the compressor is off. Air from fitting 62 is coupled and controlled through a pressure regulator 70 and pressure gauge 72 to the building condition sensor 12.

Sensor 12 includes a power sensor 74 which has an electrical appliance power cord 76 suitable for plugging into a conventional electrical outlet and an adjustable bleeder valve 78 which includes a petcock 80 for controlling the size of the bleeder valve 78 orifice. The solenoid valve 24 of power sensor 74, like other solenoids described hereinafter, includes three ports, an electrical relay having two electrical input terminals, and a valve which is controlled by the relay and which opens and closes one or more of the ports. To facilitate a distinct and clear discussion of the various valves, one input terminal of the valve, shown as the input terminal 86 of valve 24 is defined as the ground input terminal, and the other input terminal 84 is defined as the "hot" input terminal. The ports, of valve 24 are an inlet port, outlet port, and discharge port. The inlet and outlet ports, again by definition, are those ports which are in communication with each other with 115 volts applies to the hot input terminal 84 of valve 24, and the discharge port is the port which is blocked under the same condition but which is opened when the hot input terminal is at zero volts. When there is power on cord 76, there is 115 volts on the valve 24 hot input terminal 84 and valve 24 blocks passage of air from its discharge port through bleeder valve 78, accepts air from compressed air source 10 at its inlet port and applies the air to the system line 81 via its outlet port. With zero volts on hot input terminal 84, such as would be the case in the event of a power failure, the valve 24 discharge port opens to both the inlet and outlet ports. Sensor 12 also includes a temperature sensor 22 which includes a thermostat 28 and a high temperature solenoid valve 30. Thermostat 28 is a conventional, two state, three wire electrical thermostat which is connected to ordinary 60 cycle, 115 volt house wiring by a three-wire conductor 90 and provides output signal states of 115 volts and zero volts. Thermostat 28 has a pair of outputs which resemble those of the well known logic circuit referred to as a flip-flop. In FIG. 3, the outputs are labeled for their state under building normal temperature conditions. In the event of a high temperature deviation from norm, the outputs of thermostat 28 reverse (flip-flop), the normally zero volt output goes to 115 volts and the normally 115 volts output goes to zero volts. High temperature solenoid valve 30 like valve 24 is also an electric relay controlled valve having an inlet port discharge port, and outlet port. For reasons more fully explained later, the line 81 input to valve 30 is actually connected to its discharge port and the line 82 out of the valve 30 is connected to its outlet port. Valve 30 is responsive to a thermostat 27 output signal of zero volts to permit uninterrupted, unrestricted air flow and pressure in between lines 81 and 82, but is responsive to a thermostat 28 output signal of 115 volts to vent to atmosphere air only from down-line, (from trip mechanism 14) through its inlet port. Unlike in the case of the power solenoid valve 24, however, when an abnormal temperature deviation occurs, valve 30 blocks passage of air from up-line (from compressed air source 10) out of the discharge and inlet ports. The normal input voltage on the hot input of valve 30 was chosen as zero volts, and the line to inlet and discharge port convention reversed, to prevent immediate actuation of the trip mechanism 14 by valve 30 by a loss of power. Were valve 30 wired to the normally 115 volt output of high temperature thermostat 28, and the valve ports connected in the normal inlet-outlet manner of valve 24, a loss of power would cause the normally 115 volt output of thermostat 28 to go to zero volts, valve 30 would respond to the zero volt input to open its discharge and inlet ports and vent the lines 81 and 82 air to atmosphere and actuate trip mechanism 14 for all power outages including these less than a predetermined duration.

Down-line of solenoid valve 30, line 82 couples to both corrective action indicator section 32 and trip mechanism 14, the latter of which includes an air cylinder 94 and a spring loaded plunger assembly shown generally as 96. Assembly 96 includes a housing 98, thrust shaft 100 and thrust spring 102. Thrust shaft spring 102 is normally compressed and shaft 100 restrained in housing 98 by a trigger 104. Trigger 104 engages an indent 106 in thrust shaft 100. Indent 106 is a groove machined into thrust shaft 100 and the rearward wall of which is angled to provide a beveled surface 108 which insures disengagement of trigger 104 from indent 106 upon operation of the trip mechanism. Normally, trigger 104 is held in indent 106 by the line 82 air pressure. Air pressure from line 82 normally forces piston head 112 of piston shaft 110 downward to compress air valve push spring 114 and similarly push shaft 110 downward to hold trigger 104 in indent 106. Upon a sufficient reduction of the line 82 air pressure, spring 114 expands to lift on trigger 104 through shaft 110 and compressed thrust spring 102 acting through beveled surface 108 of shaft 100 further promotes disengagement of trigger 104 from indent 106. Upon disengagement of trigger 104 thrust spring 102 uncompresses to drive thrust shaft 100 out of housing 98. Collar 116 on thrust shaft 100 contacts end 118 of housing 98 to limit forward movement of shaft 100. Thrust shaft 100 includes a thrust head 101.

The line 82 and line 83 connections to corrective indicator action section 32 are in the normal manner for the assumed definitions of this description, i.e., to the inlet and outlet ports of low temperature solenoid valve 103. Valve 103 is identical to valve 30. With 115 volts on the hot input terminal, there is communication between the inlet and outlet ports and the discharge port is blocked. As shown, the low and high temperature thermostats 28 and 36, respectively, have their normally 115 volt outputs interwired and connected to the hot terminal of valve 103 to provide what essentially amounts to an OR gate logic function input to valve 103. When either of these two thermostats normally 115 volt outputs goes to zero volts (to ground), either that of valve 30 or that of valve 103, the dis-charge port of valve 103 is opened to operate air horn 105 through line 85 off of the energy stored in tank 107. By wiring the normally 115 volt outputs to valve 103, the horn is operated for all power outages.

Figures 4, 5, 6:
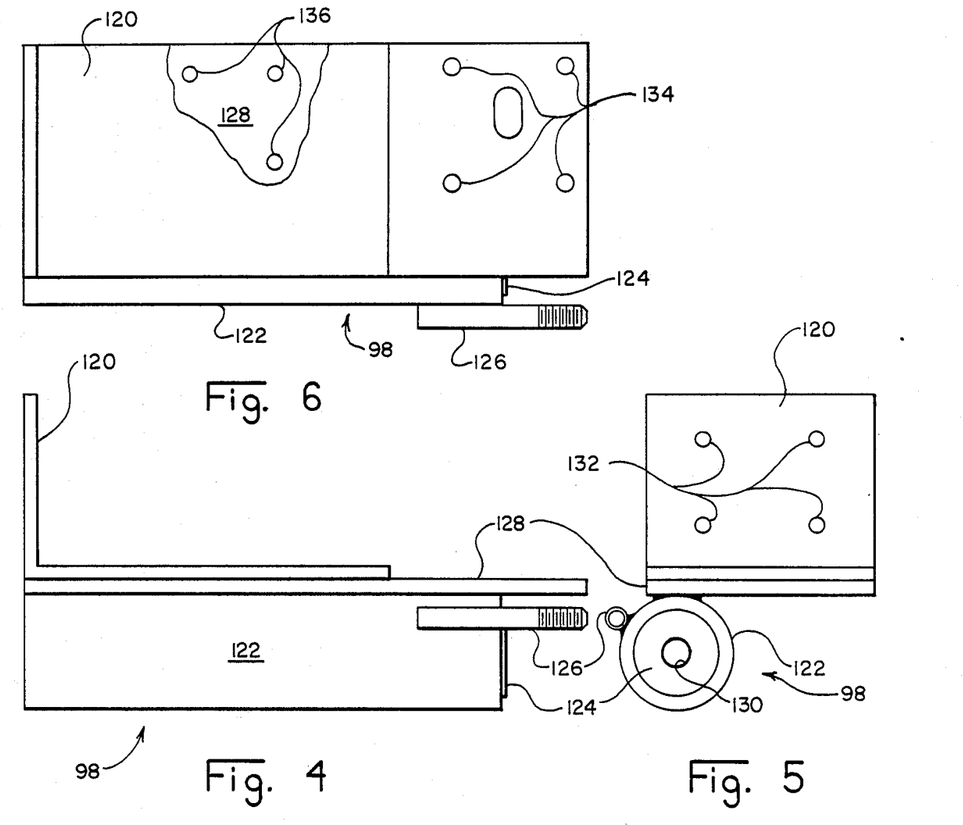
FIG. 4 is a side elevational view of a portion of the air operated trip mechanism of FIG. 3.
FIG. 5 is an end elevational view of the portion of the air operated trip mechanism illustrated in FIG. 4.
FIG. 6 is a top view of the portion of the air operated trip mechanism illustrated in FIGS. 4 and 5.

FIGS. 4, 5, and 6 are side and end elevational and top views of the thrust shaft housing 98 and trip mechanism mounting bracket 120. Housing 98 includes a main cylinder 122 having a plug 124 in one end, a trigger pivot 126 attached to one side, and a mounting plate 128 attached to the top of the cylinder. As shown in FIG. 5, plug 124 includes an aperture 130 for passage therethrough of thrust shaft 100, and mounting bracket 120 includes apertures 132 for attaching the mounting bracket to orient the housing 98 at right angles to a surface to which it is attached. FIG. 6 illustrates apertures 134 which provide for attachment of the remainder of air valve 94 to mounting plate 128 and apertures 136, likewise in mounting plate 128, which provide for attaching housing 98 in an attitude parallel with a surface to which it is attached.

Figure 7:
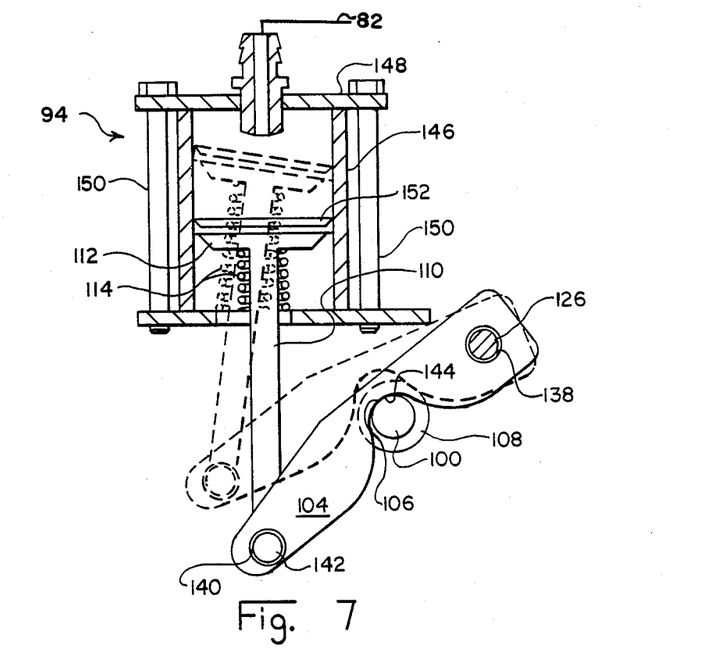
FIG. 7 is a sectional view through a portion of the air operated trip mechanism of and along line 7—7 in FIG. 3.

FIG. 7 is a sectional view through air cylinder 94, trigger 104, and indent 106 of thrust shaft 110 along line 7—7 of FIG. 3. Trigger 104 includes an aperture 138 for providing pivotal movement of trigger 104 around trigger pivot 126. Another apertures 140 in trigger 104 accepts the end 142 of piston shaft 110. The view is shown with piston shaft 110 in a fully extended position with air valve push spring 112 fully compressed such as it would be with the system activated and a normal building environment. With piston shaft 110 fully extended, yoke 144 of trigger 104 is fully engaged in indent 106. As shown by the dashed lines, upon a sufficient reduction of the line pressure to permit full expansion of push spring 114, piston shaft 110 is fully withdrawn, and trigger 104 is pivoted by the lifting action of end 142 to disengage yoke 144 from indent 106 sufficient to completely clear thrust shaft 100. In FIG. 7 air cylinder 94 is shown to also include air cylinder sleeve 146 which is held between a top plate 148 and mounting plate 128 by means of bolts 150. A compressible piston seal cap 152 is fitted to piston head 112.

Figure 8:
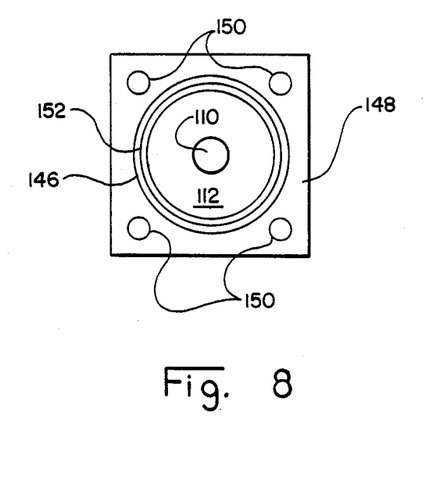
FIG. 8 is a sectional view through the air cylinder of the air operated trip mechanism of and along line 8—8 of FIG. 3.

FIG. 8 is a sectional view through air cylinder 94 along line 8—8 of FIG. 3 and illustrates the circular shape of sleeve 146, piston seal cap 152 and piston head 112.

A fully operative prototype model of the preferred embodiment of FIGS. 3 through 8 was constructed from the components set forth in Table 1 below:

TABLE 1

Components of Prototype Model solenoid valve 24: rated for 125 pounds line pressure, 115 volt, 60 cycle line current, includes a normally open relay in response to an applied input of 115 volts; Asco Red Hot Model #8262C31;

thermostats 28 & 36: 30 to 110 degree range of temperature measurement; zero volt output and a 115 volt output; outputs reverse signal states in a flip-flop fashion; rated at 115 volt, Penn Temperature Control Model A19 Space Thermostat;

solenoid valves 30 and 103: rated for 125 pounds line pressure, 115 volt, 60 cycle line current, includes a normally open relay in response to an applied input of 115 volts; Asco Red Hot Model #8320A13;

motor 50 & compressor 52: rated at 100 psi, Watsco Model UP111;

alarm 105; an air horn: manufactured by the Falcon Air Horn Company, Mountain Side, New Jersey, Patent #RE24780;

T-fitting 58: ¼ inch brass pipe tee;

pressure switch 60: 150 psi, 1 H.P., single phase, 115-230 VAC, Central Manufacturing Company, Model #undeterminable;

T-fitting 62: ¼ inch galvanized pipe tee;

safety valve 66: variable from zero to 200 psi, manufactured by Advance Die Casting Company supplied through Sanborn Manufacturing Company of Springfield, Minnesota, Model 351;

pressure tanks 68 & 107: 8-gallon air compressor tank; rated for 200 psi;

pressure regulator 70: exact rating undeterminable, operated over range from zero to 200 psi, adjustable, obtained through the above Sanborn Manufacturing Company, their Model 263;

pressure gauge 72: zero to two-hundred pounds; make and model unknown;

petcock 80: a cnventional petcock valve with a ⅛ inch maximum opening;

lines 81, 82, 83 and 85: ¼ inch air hose;

housing 98: 1¼ inch inside diameter galvanized steel pipe, 6½ inches long, plugged with an inch long 1¼ inch O.D. steel shaft welded into the housing and including an 11/16 inch diameter hole axially bored through the center of the plug;

shaft 100: 16 inch long ⅜ inch steel rod with an ⅛ by 1¼ inch steel disc as head 101; a 5/16 spring pin in a 5/16 hole in the shaft proper and a 5/8 inch flat washer form collar 116;

spring 102: 18 inch long, one inch O.D. about eight gauge spring steel wire, about 2½ turns per inch, and exerts a force of 75 pounds when compressed to a length of 6¾ inches; International Harvester Model N42899.

trigger 104: stainless steel, including a ¼ inch diameter linking aperture 140 and a ¼ inch diameter pivot aperture 138 spaced apart center-center 2⅜ inches with a collar 144; the top of collar 144 is 9/32 inch from a line through the centers of apertures 138 and 140 and the collar top is 1⅜ inch point to point from the center of aperture 140 and 1 1/16 inch point to point from the center of aperture 138; the upper part of the trigger linking aperture end is beveled as necessary to prevent contact with the mounting plate; the collar tapers inwardly from corners radiused convexly on a large radius at each side of the opening to about a ⅜ inch radius at the top of the collar;

indent 106: ⅛ inch deep with a 45° beveled surface 108; located on center about 12 7/16 inch from head 101;

shaft 110: ¼ inch steel rod, 2½ inch vertical length and ¾ inch horizontal length;

piston head 112: 1 3/16×3/32 inch steel disc;

piston seal cap 114: 1¼ inch diameter brake seal cup;

pivot pin 126: 1½ inch×¼ inch stud bolt welded to the housing 98 by weld beads which locate the pin center 13/16 inch horizontally and ⅜ inch vertically from the center of housing 98;

top plate 148: ¼×2×2 inch steel plate; including four 3/16 inch holes in a square array measuring about 1¼ inch center to center on a side;

sleeve 146: a 1¼ inch drawn over mandrel pipe the inside of which was buffed with emery paper and the ends of which were turned on a lathe so they were flat enough to form air tight seals against top plate 148 and mounting plate 128;

bolts 150: 3/16×2½ inch carriage bolts;

mounting plate 128: 3/16×3×7½ inch steel plate including four 3/16 inch holes one at each corner of a square about 1¼ inches center to center on a side; the array formed by the four holes is located to one side of the bracket a distance which will provide for nearly vertical movement of piston shaft 110; and including a slot which permits canting of piston shaft 110 during its upward stroke;

mounting bracket 120: a nine inch overall length of 3/16×3 inch steel plate and consisting of a three inch upturned length and six inch length flat against plate 128;

push spring 114: 2 inch long, 15/16 inch outside diameter, 4 turns per inch of about 12 gauge steel wire which is compressed to an overall length of ¾ inch at about 30 psi applied to piston head 112 and with about 18 psi applied to piston head 112 and with thrust spring 102 acting through beveled surface 108 the spring is uncompressed from a compressed state sufficiently to completely disengage trigger 104 from indent 106.

Construction and assemblage of the system is performed in usual and customary manner except that hydraulic fluid is poured into the brake seal cup as a precautionary measure against the cup lodging in sleeve 146. To use the system, the trip mechanisms are attached to window sills, door jams or other surfaces as appropriate by any suitable means such as ten penny nails, lag screws, or bolts. If necessary, the openings are modified to include a force operated latch such as a magnetic catch. All system components are wired into the building wiring or plugged into a conventional outlet and the compressor started. Pressure switch 60 is adjusted to maintain the tank 68 pressure at 150 psi and pressure regulator 70 adjusted to maintain a line pressure of 40 psi. Using pressure gauge 72, petcock 80 is adjusted by trial and error to bleed off air to achieve a line pressure of 18 psi in the desired interval of time. The interval desired depends on the application and takes into consideration such matters as the type of livestock animal, their age, and the animal density. With the system fully energized and line 82 at at least about 30 psi, thrust shaft 100 is pushed into housing 98 until trigger 104 is driven into indent 106 to lock the shaft 100 in a spring loaded condition in housing 98. Upon each loss of power, no matter of what duration, and each temperature deviation from norm, horn 105 is energized. For each high temperature deviation and those power outages of greater than a predetermined interval, trip mechanism 14 is also actuated.

Figure 9:
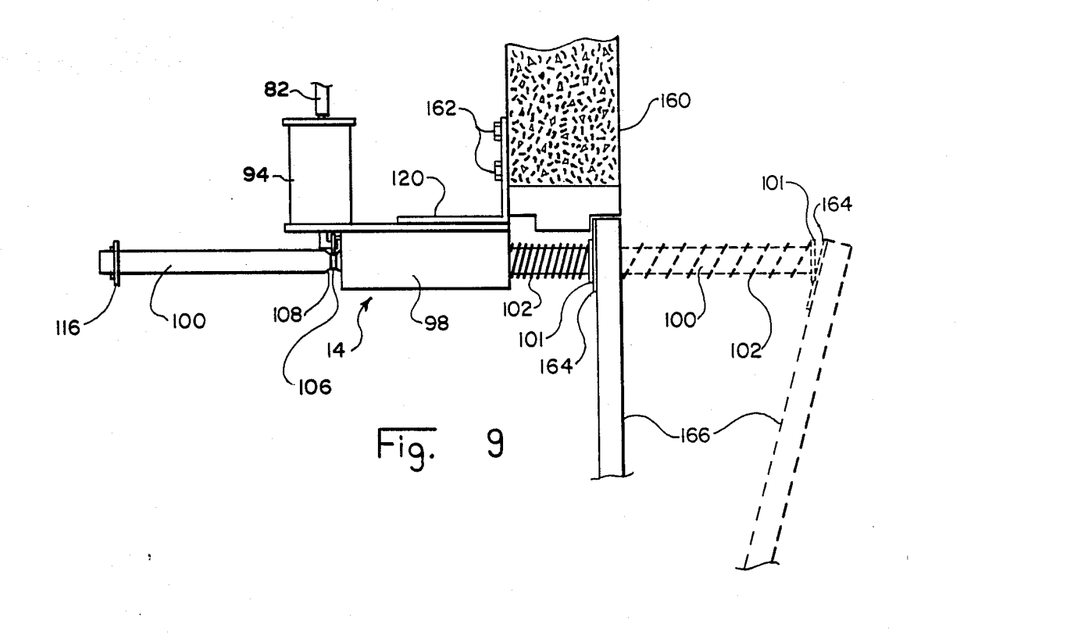
FIG. 9 is a top view of a section through a building which illustrates attachment of an air operated trip mechanism to a door jamb.

FIG. 9 is a top view which illustrates the mounting of a trip mechansim 14 to a doorjamb 160. Attachment bracket 120 is bolted to jamb 160 by bolts 162. A thrust plate 164 is attached to the edge of a door 166. Upon actuation of trip mechanism 14, the head 101 of thrust shaft 100 pushes on and slides along thrust plate 164 to open door 166. Door 166 is held in a normally closed position by means such as a magnetic catch (not shown) or by one-way or two-way springs (also not shown) such as are used on swinging doors.

Figure 10:
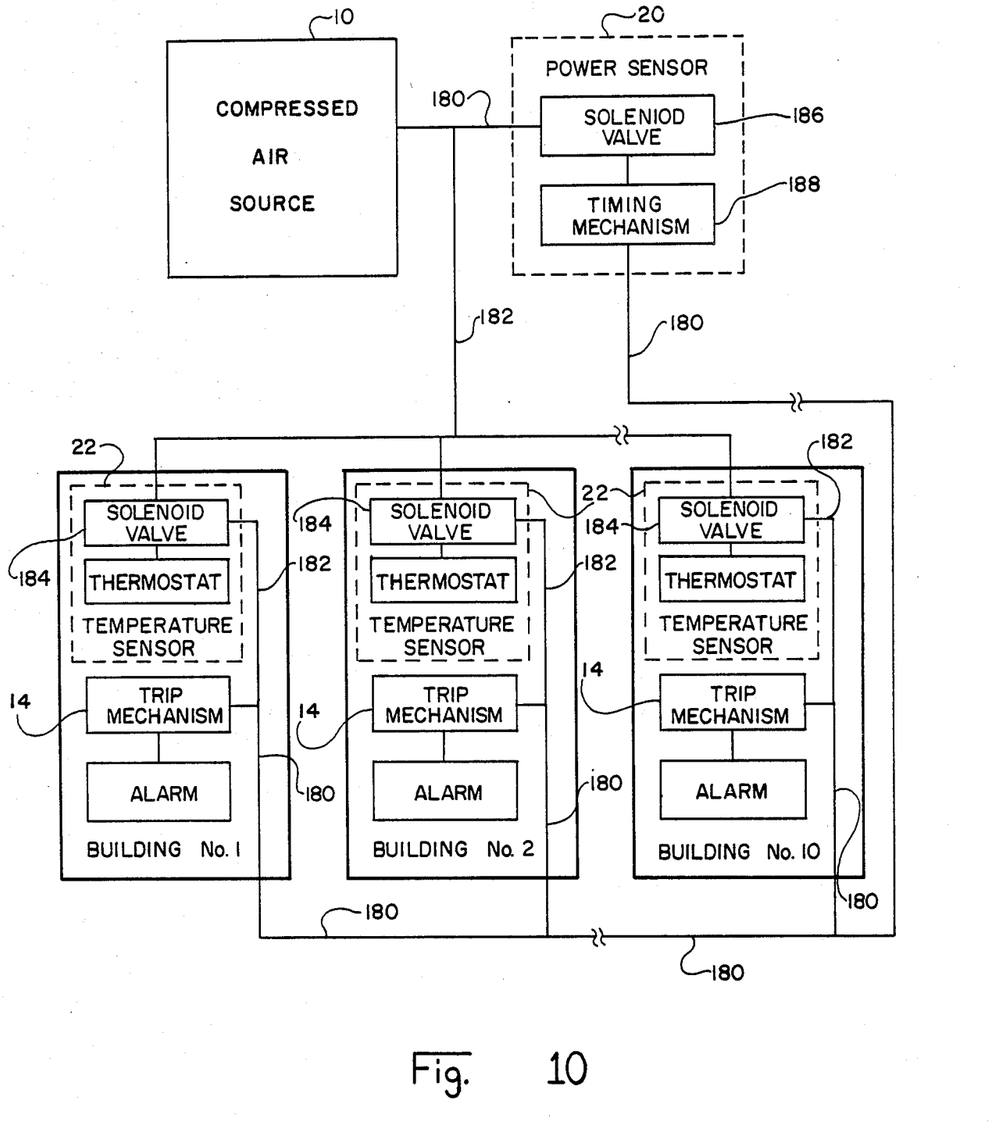
FIG. 10 is a schematic diagram of a positive pressure operated system according to the present invention.

FIG. 10 is a schematic diagram of a positive pressure operated system alternative embodiment of the present invention. Compressed air from source 10 is outputted on a pair of parallel system lines 180 and 182. System power line 180 is coupled in series with power sensor 20 directly to each building trip mechanism 14. Similarly, system temperature line 182 is applied in series with each building temperature sensor 22 and trip mechansim 14. Temperature sensor 22 and power sensor 20 include idential solenoid valves 184 and 186, respectively and power sensor 20 also includes timing mechanism 188. Solenoid valves 184 and 186 are each a normally closed valve to normally block passage of air from compressed air source 10 to trip mechanisms 14. In the event of a temperature emergency condition, compressed air from source 10 is immediately applied to trip mechanisms 14. As in the case of the converse mode of operation of the embodiment of FIGS. 3 through 8, a power emergency must exit a pre-determined time as determined by timing mechanism 188. Mechanism 188 could conveniently take the form of a reduction in the size of line 180 such as by through a control valve connected in series in the line.

The foregoing is given by way of illustration and not limitation and the present invention encompasses all equivalent means for practicing and carrying out the invention. To illustrate, again by way of example and not limitation, a normally contracted bellows could be substituted for the air cylinder 94, and indeed it is believed that such a bellows might be preferable to a piston type air valve, and the corrective action means could include actuation of an automatic sprinkling system for cooling the animals.

What is claimed is:

1. An emergency ventilation system for a livestock building including doors, windows or other openings movable between open and closed positions for selective fluid communication with outside ambient air, comprising:

a source of compressed gas;

means for sensing supply of electrical power to the livestock building;

a gas-operated trip mechanism associated with the building opening, said building opening being normally positioned in one of the open and closed positions;

valve means fluidly connected between said compressed gas source and said trip mechanism;

said valve means being responsive to said power sensing means in order to normally maintain fluid communication between said compressed gas source and said trip mechanism, but to vent flow from at least said mechanism upon an interruption in the power supply in order to actuate said mechanism whereby the building opening is moved to the other of said positions; and means associated with said valve means for controlling the rate at which gas is vented therefrom so that a temporary power interruption will not cause actuation of said trip mechanism.

2. The emergency ventilation system of claim 1, wherein said source of compressed gas comprises compressed air.

3. The emergency ventilation system of claim 1, wherein said source of compressed gas comprises:
a tank;
an air compressor fluidly connected to said tank; and
a motor driving said compressor, said tank and compressor both being fluidly connected to said valve means.

4. The emergency ventilation system according to claim 3, further including:
a pressure switch fluidly connected between said tank and compressor.

5. The emergency ventilation system of claim 1, further including:
a pressure regulator fluidly connected between said compressed gas source and said valve means; and
a pressure gauge fluidly connected between said compressed gas source and said valve means.

6. The emergency ventilation system of claim 1, wherein said controlling means comprises:
an adjustable bleed valve fluidly connected to a normally closed discharge port of said valve means.

7. The emergency ventilation system of claim 1, further including:
means for sensing a predetermined environmental condition within the building;
said valve means also being responsive to said environmental condition sensing means in order to block flow from said source of compressed gas but simultaneously vent flow from said trip mechanism upon any predetermined deviation in the second environmental condition.

8. The emergency ventilation system of claim 1, further including:
means fluidly connected to said valve means for providing an indication of any necessary corrective action upon actuation of said trip mechanism.

9. An emergency ventilation system for a livestock building with an opening movable between open and closed positions, comprising:
a tank;
an air compressor fluidly connected to said tank;
a motor driving said compressor;
means for sensing supply of electrical power to the livestock building;
means for sensing a predetermined environmental condition within the livestock building;
a pneumatic actuator associated with the building opening, said building opening being normally positioned in one of said open and closed positions; and
valve means fluidly connected between said compressor and tank and said actuator;
said valve means being responsive to said power sensing means and said environmental condition sensing means in order to normally maintain pressurized fluid communication between said compressor and tank and said actuator, but to vent flow from at least said actuator upon either an interruption in the sensed power supply or a predetermined deviation in the sensed environmental condition so that the building opening is moved by said actuator to the other of said open and closed positions.

10. The emergency ventilation system of claim 9, further including:
a pressure switch fluidly connected between said tank and compressor.

11. The emergency ventilation system of claim 9, further including:
a pressure regulator and pressure gauge fluidly connected in series between said compressor and tank and said valve means.

12. The emergency ventilation system of claim 9, wherein the predetermined environmental condition sensed by said environmental sensing means comprises temperature.

13. The emergency ventilation system of claim 9, further including:
wherein said valve means also vents pressure flow from said compressor and said tank upon any interruption in electrical power, and further including:
means associated with said valve means for controlling the rate at which pressure is vented from the system so that temporary power interruptions will not cause actuation of said actuator.

14. The emergency ventilation system of claim 9, further including:
means fluidly connected to said valve means for providing an indication of any necessary corrective action upon actuation of said actuator.

15. An emergency ventilation system for a livestock building with an opening movable between open and closed positions for selective fluid communication with outside ambient air, comprising:
a compressed air source;
means for sensing supply of electrical power to the livestock building;
means for sensing temperature within the livestock building;
a pneumatic actuator associated with the building opening, said actuator being movable between extended and retracted positions and being normally positioned in one of the extended and retracted positions;
first valve means fluidly connected between said pressure source and said actuator, said first valve means being responsive to said power sensing means to normally maintain fluid communication therebetween, but to bleed pressure therefrom upon any interruption in the electrical power;
means associated with said first valve means for controlling the bleed rate of pressure from the system in order to avoid immediate actuation of said pneumatic actuator during a temporary power interruptions; and
second valve means fluidly connected between said first valve means and said pneumatic actuator, said second valve means being responsive to said temperature sensing means and said power sensing means in order to normally maintain fluid communication therebetween but to vent pressure only from said actuator upon a predetermined temperature deviation within the building.

16. The emergency ventilation system of claim 15, wherein said compressed air source comprises:
a tank;

a compressor fluidly connected to said tank;
a pressure switch fluidly connected between said tank and compressor;
said tank and compressor both being fluidly connected to said first valve means; and
a pressure regulator fluidly connected between said first valve means and said tank and compressor.

17. The emergency ventilation system of claim 15, wherein said bleed rate control means is adjustable.

18. The emergency ventilation system of claim 15, further including:
indicator means responsive to actuation of said pneumatic actuator.

* * * * *

UNITED STATES PATENT AND TRADEMARK OFFICE
CERTIFICATE OF CORRECTION

PATENT NO. : 4,832,260

DATED : May 23, 1989

INVENTOR(S) : Rodney L. Spilde

It is certified that error appears in the above-identified patent and that said Letters Patent is hereby corrected as shown below:

Column 3, line 21, change "showm" to --shown--.

Column 4, line 26, change "27" to --28--.

Column 5, line 45, change "110" to --100--.

Column 6, line 62, change "2 3/8" to --2 5/8--.

Signed and Sealed this

Thirteenth Day of March, 1990

Attest:

JEFFREY M. SAMUELS

*Attesting Officer*   *Acting Commissioner of Patents and Trademarks*